Figure 1:
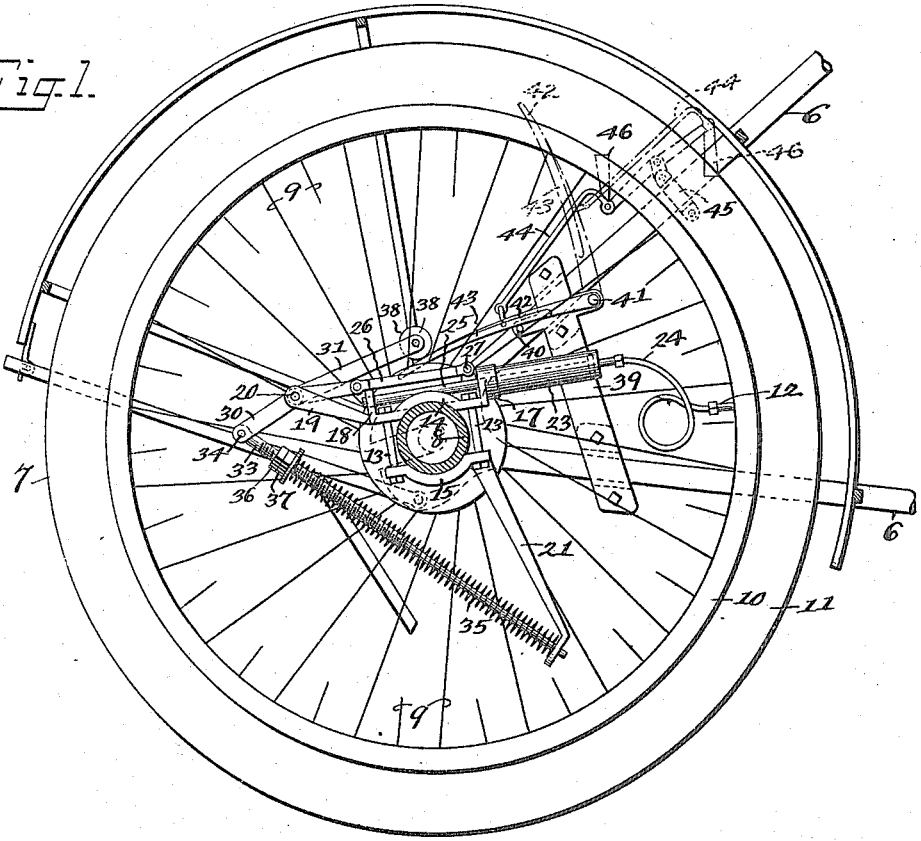

W. G. WILKES.
TIRE PUMP.
APPLICATION FILED JAN. 15, 1915.

1,169,705.

Patented Jan. 25, 1916.
2 SHEETS—SHEET 1.

WITNESSES:
George L. Blume
J. E. Larsen

INVENTOR
Walter G. Wilkes
BY Munn & Co
ATTORNEY

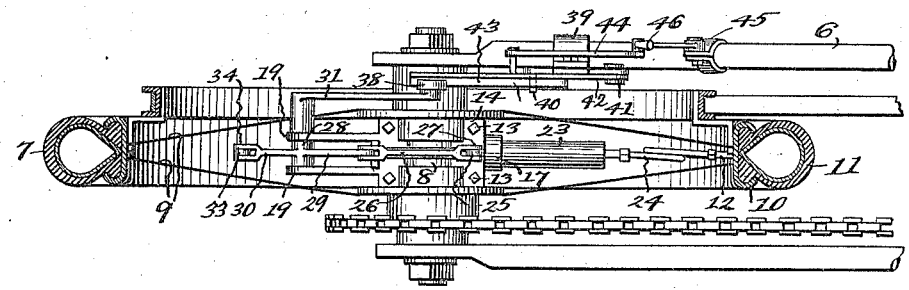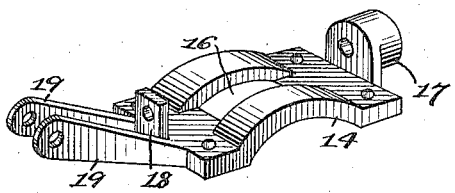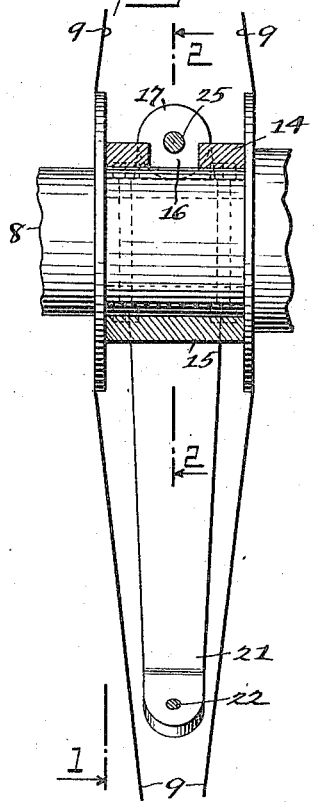

UNITED STATES PATENT OFFICE.

WALTER G. WILKES, OF BILOXI, MISSISSIPPI.

TIRE-PUMP.

1,169,705.　　　　　Specification of Letters Patent.　　Patented Jan. 25, 1916.

Application filed January 15, 1915. Serial No. 2,375.

*To all whom it may concern:*

Be it known that I, WALTER G. WILKES, a citizen of the United States, and a resident of Biloxi, in the county of Harrison and State of Mississippi, have invented certain new and useful Improvements in Tire-Pumps, of which the following is a specification.

My invention relates to means for pumping pneumatic tires on vehicles, and one of the main objects thereof is to provide such means which may be automatically actuated by the normal operation of a wheel of said vehicle, and a further object is to provide means for throwing the pumping means into or out of operation at will, during the movement of the vehicle.

My invention is fully described in the following specification, of which the accompanying drawings form a part, in which like reference characters are used to designate like parts in each of the views, and in which:—

Figure 2:
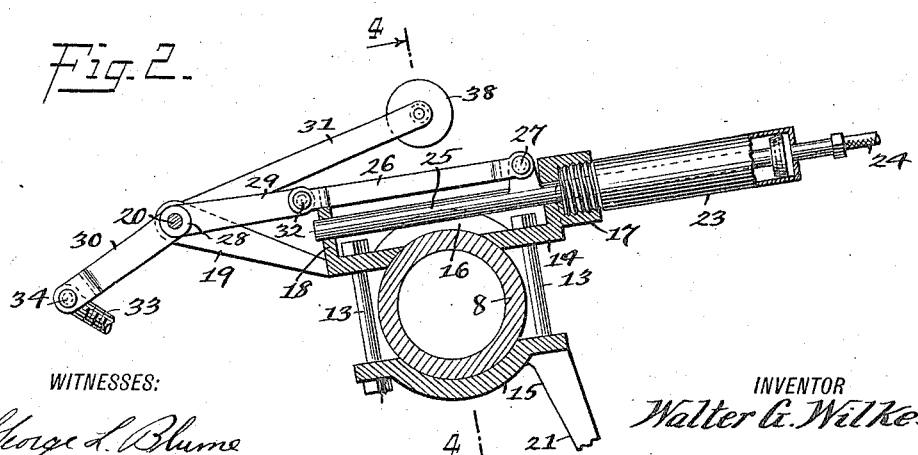

Figure 1 is a section taken through the rear wheel of a motor-cycle, on the line 1—1 of Fig. 4, provided with my invention; Fig. 2 is an enlarged, fragmentary, section taken on the line 2—2 of Fig. 4; Fig. 3 is a plan view of the wheel with the rim and tire broken away; Fig. 4 is a section taken on the line 4—4 of Fig. 2; and Fig. 5 is a detached, perspective, view of a detail of the construction.

In the drawings forming a part of this application I have shown a present preferred form of embodiment of my invention connected with a motor-cycle having a frame 6, a rear wheel 7 having a hub 8, spokes 9, a rim 10, and a pneumatic tire 11, all of the usual form, a valve 12 being provided for said tire and of conventional form.

My invention is adapted to be mounted upon the motor-cycle without any alteration of the structure thereof, and, while shown in its adaptation for wire wheels, it may also be adapted for wood wheels such as are commonly used upon automobiles, the form about to be described being adapted to be arranged partially within and partially out of the planes of the spokes.

Secured to the hub 8, by means of suitable bolts 13, are two clamping members 14 and 15, the former of which is slotted at 16, Fig. 5, and provided with an internally screw-threaded collar 17 at one end, a lug 18 at its opposite end, and two projecting arms 19 at the latter end serving as supports for a pivot pin 20; the member 15 is provided with a projecting arm 21 having a hole 22 through the end thereof, and the object for which will be later disclosed.

Threaded into the collar 17 is a pump cylinder 23 in communication with the valve 12 by means of a flexible tube 24, said cylinder having the usual piston therein having a rod 25 thereon, extending beyond the cylinder and guided in the lug 18, and said piston rod is in pivotal connection with a link 26 at 27, Figs. 1 and 2.

Rotatably mounted on the pin 20 in the arms 19 is a sleeve 28 having three arms, 29, 30 and 31, in integral connection therewith, the first of which is in pivotal connection with the link 26 at 32; the arm 30 is in pivotal connection with one end of a rod 33, at 34, the other end of which is freely movable in the hole 22 of the arm 21, and I provide a coil spring 35 on said rod and the tension of which is adjustable by means of locknuts 36 and 37, said rod being threaded to receive said nuts, and the tendency of said spring is to resist movement of the said nuts toward the arm 21 through which its rod 33 passes; the arm 31 carries a roller 38 at its end and is the means for revolving the sleeve 28 and thus swinging the arms 29 and 30 through an arc of a circle.

All the parts so far described are within the two series of spokes, centrally of the wheel, with the exception of the pivot pin 20 and the arm 31 with its roller 38 which are arranged outside of said wheel, as clearly shown in Fig. 3, but within the frame 6 in such manner as not to come into contact with said frame.

Secured to the frame 6 is a plate 39 by means of suitable clamps or bolts, said plate carrying a stop 40 and a pivot pin 41 for a lever 42 having a track 43 thereon in the vertical plane of the roller 38, the normal position of said lever, when the parts are in operative position, being clearly shown in Fig. 1, with the outer end of said lever closer to the axis of the hub 8 than is its pivoted end, thus providing an incline up which the roller moves in the revolution of the wheel 7 until the end of the track 43 is reached, when said roller resumes its normal position. In this roller movement along said track the arms 29, 30 and 31 are moved through arcs of a circle, the first arm drawing the piston rod 25 backwardly out of the cylinder 23, and the arm 30 forcing the rod 33 through the hole 22 of the arm 21, against the spring 35, but, when the roller passes the end of said track, the spring 35 returns the parts to normal positions, thus forcing the piston rod inwardly of the cylinder and forcing air through the valve 12 into the tire, this being repeated upon each revolution of the wheel 7; the nuts 36 and 37 are so adjusted as to control the amount of air so pumped into the tire, by the increase or decrease of the power of the spring 35 in the nut adjustment.

In pivotal connection with the lever 42 is a link 44 also in pivotal connection with a clamp 45 on the frame 6, a handle 46 being provided for said link and which, when drawn over into the alternate position indicated by dotted lines in Fig. 1, raises the lever 42 on its pivot into the dotted position shown, entirely out of the path of the roller 38, and the pump is thus rendered inoperative.

The pump piston is thus drawn outwardly of the cylinder in each revolution of the wheel 7, with the track 43 in operative position, and is returned by means of the spring 35 which is adjustable as to operating power by means of the lock-nuts 36 and 37, and it will be seen that my device may be employed to inflate empty tires, either new or after removal for repair, or it may be employed to constantly pump a leaking tire and thus enable the rider to reach home or a repair shop; however, if the device is not needed, the parts insuring operation may be quickly and easily moved out of operative position, this being accomplished from the driver's seat, preferably, although not so shown as the exact lever arrangement forms no part of this application and is subject to modification.

My invention is very simple, though efficient; it may be attached to a conventional motor-cycle without any alteration to the latter; it is very light, compact, and comparatively inexpensive; and it may be altered in details to accommodate the same to different types of vehicles.

Having fully described my invention, what I claim as new, and desire to secure by Letters Patent, is:—

The combination in a vehicle having a frame and a wheel provided with a hub, spokes, and a pneumatic tire; of a clamping member secured on said hub provided with a threaded collar at one end and a lug and projecting arms at the other end, a pump threaded into said collar, a pump-rod projected therefrom, and guided in said lug, a pivot carried by said arms, a sleeve revoluble on said pivot, provided with three arms, a roller on one sleeve arm, a link connecting another sleeve arm with said pump-rod, a spring resisted rod pivoted to the other sleeve arm, means for guiding said rod and for supporting said spring, and a track carried by said frame arranged tangentially of the path of said roller and in said path, whereby said roller arm is moved to revolve said sleeve to actuate said pump-rod against the resistance of said spring, said spring serving to return said parts to initial positions when said roller reaches the outer end of said track.

In testimony whereof I have signed my name to this specification in the presence of two subscribing witnesses.

WALTER G. WILKES.

Witnesses:
P. A. GILLY,
G. BARROW COUSINS.

Copies of this patent may be obtained for five cents each, by addressing the "Commissioner of Patents, Washington, D. C."